United States Patent [19]

Phoenix et al.

[11] E Re. 31,589

[45] Reissued May 22, 1984

[54] THERMAL INSULATION MOLTEN METAL

[75] Inventors: Richard C. Phoenix, Lakewood; Edward J. Jago, Berea, both of Ohio

[73] Assignee: Foseco Trading A.G., Chur, Switzerland

[21] Appl. No.: 786,037

[22] Filed: Apr. 8, 1977

Related U.S. Patent Documents

Reissue of:

[64] Patent No.: 3,876,420
Issued: Apr. 8, 1975
Appl. No.: 226,933
Filed: Feb. 16, 1972

U.S. Applications:

[63] Continuation of Ser. No. 851,745, Aug. 20, 1969, abandoned.

[51] Int. Cl.[3] ..... C21B 15/02; B22D 7/00

[52] U.S. Cl. ..... 75/27; 75/96; 106/38.22; 164/123

[58] Field of Search ..... 75/27, 96; 106/38.22; 149/37; 164/123

[56] References Cited

U.S. PATENT DOCUMENTS

| | | | |
|---|---|---|---|
| 2,148,583 | 2/1939 | Rowe | 164/123 |
| 2,165,945 | 7/1939 | Seaver | 164/123 |
| 2,239,530 | 4/1941 | Langenohl | 117/69 |
| 2,317,209 | 4/1943 | McCluer | 117/126 |
| 2,462,256 | 2/1949 | Charman | 164/123 |
| 2,486,050 | 10/1949 | Miller | 117/140 |
| 3,077,413 | 2/1963 | Campbell | 117/126 |
| 3,106,756 | 10/1963 | Demaison | 106/38.2 |
| 3,123,878 | 3/1964 | Davidson | 106/38.2 |
| 3,262,165 | 7/1966 | Ingham | 106/38.22 |
| 3,326,273 | 6/1967 | Jago | 106/38.27 |
| 3,405,028 | 10/1968 | Nouveau | 106/38.25 |

FOREIGN PATENT DOCUMENTS

| | | | |
|---|---|---|---|
| 796703 | 6/1958 | United Kingdom | 117/69 |

*Primary Examiner*—Donald P. Walsh
*Attorney, Agent, or Firm*—Cushman, Darby & Cushman

[57] ABSTRACT

There is disclosed a material and method for preventing heat loss from molten metal, one side of this material being impregnated with heat insulating refractory or exothermic material. The impregnated side has a porosity of less than about 50 AFS units and contains a binder.

30 Claims, No Drawings

THERMAL INSULATION MOLTEN METAL

Matter enclosed in heavy brackets [ ] appears in the original patent but forms no part of this reissue specification; matter printed in italics indicates the additions made by reissue.

CROSS REFERENCE TO RELATED APPLICATION

This application is a continuation of my application Ser. No. 851,745, filed Aug. 20, 1969 and now abandoned.

BACKGROUND OF THE INVENTION

The present invention relates to the thermal insulation of molten metal.

In many cases in the foundry and steel making industries it is desired to minimize the loss of heat from bodies of molten metal—for example in ladles and tundishes, or in the heads of solidifying ingots, or in the risers of castings.

It is customary to line the sides of ingot moulds, casting risers, ladles and tundishes with a layer of heat insulating material. However, the maximum insulation attainable by this method is often considered insufficient, and methods have therefore been proposed to minimize the heat loss from the horizontal molten metal surface.

Such methods include the provision of a moulded insulating cover (for example of plaster, clay, fire-brick) or of a layer of powdered heat insulating material (for example rice husks). In addition, it may be desirable positively to supply heat to the molten metal and the use of an exothermic composition has been proposed and employed. A further known procedure is to place on the molten metal surface a mixture of loose powdered exothermic material and loose powdered heat insulating material contained in a cardboard or like container to ease handling. However, these procedures have proved to be unsatisfactory because of the high inclusion levels of these loose powdered materials in the surface of the solidified metals. Further, as can be appreciated the loose powdered materials, because they must be shipped and stored in containers which may spill or leak, are often difficult to handle and often lead to an unevenness in the level of application with a consequent unevenness in the heat insulating properties of the insulative coating.

It is, therefore, an object of the present invention to provide a heat insulating material which when applied to the exposed surfaces of molten metal affords covering for the surface of the molten metal and a low inclusion level of the insulation material in the solidified molten metal.

It is also an object of the invention to provide a heat insulating material for application to the exposed surfaces of molten metal which is self-supporting and, therefore, easy to handle, ship, store and apply.

DESCRIPTION OF THE INVENTION

According to the present invention there is provided a material for minimizing heat loss from the exposed surfaces of molten metal bodies which comprises a preformed fibrous mat in sheet form having an inner metal facing surface and an outer exposed surface, with only the metal facing surface of the mat being impregnated with a material selected from the group consisting of heat insulating refractory materials and exothermic materials, and containing a binding agent to bind these materials to the fibers of the metal facing surface of the fibrous mat and with this metal facing surface having a porosity of less than about 50 AFS units.

The insulating material of the present invention because it is self-supporting (that is, a discrete substance which may be handled without disintegrating) may be preformed into large sheets and then cut to the desired size (as for example, by sawing) just prior to use. In use the insulating material of the present invention is laid upon the exposed surface of the molten metal with the inner metal facing impregnated surface downwards. This impregnated surface provides a refractory facing which covers the molten metal surface and minimizes heat loss from the molten metal body by radiation. The outer exposed surface of unimpregnated fibre is highly thermally insulative.

The fibrous mat may be made from refractory fibrous material, for example, asbestos, slag and mineral woods, aluminum silicate fibres, calcium silicate fibres, and metal fibres, or it may be made of organic fibrous material such as cotton, jute, acrylonitrile, and other cellulosic or synthetic organic polymeric fibres of mixtures thereof. In addition, carbonized fibres, e.g., carbonized acrylonitrile fibres may also be employed.

The refractory heat insulating impregnating material is preferably a finely divided refractory (preferably at least 20 percent by weight passing a 200 BSS mesh, more preferably at least 50 percent by weight passing a 200 BSS mesh) such as sand, silica flour, sillimanite, grog, zirconia, burned dolomite, refractory silicate, alumina, magnesia, zircon flour, chromite flour.

While most any exothermic materials may be employed to impregnate the metal facing surface of this fibrous mat, however, it is preferred to use an exothermic of the type employing a finely divided (preferably at least 5 percent by weight passing a 200 BSS mesh) oxidizable material such as aluminum calcium silicide, magnesium or ball mill dust, and an oxidising agent therefor, for example an alkali metal or ammonium nitrate, chlorate or perchlorate, or iron oxide (haematite, millscale) or manganese dioxide.

The binding agent used to bind either or both of the refractory or exothermic materials to the fibers of the metal facing surface of the fibrous mat may be any of those normally used in the foundry materials art, as for example, natural or synthetic gums or resins, (phenol and ureaformaldehyde, furane), alkali metal silicates, sulphite lye, colloidal silica, aluminum phosphates. The total thickness of the fibrous mat is preferably between about 6 and about 150 mm, more preferably between about 12 and about 50 mm, the thickness of the impregnated portion of the fibrous mat ranges correspondingly preferably between about 1 and about 50 mm, more preferably between about 6 and about 25 mm.

The density of the fibrous mat before the impregnation is preferably in the range of about 0.008 and about 0.65 gm/cc, more preferably between about 0.03 and about 0.3 gm/cc, while that of the impregnated portion is correspondingly preferably in the range of between about 0.03 and about 1.5 gm/cc, more preferably in the range of between about 0.05 and about 1.0 gm/cc.

If desired, the fibrous mat may be faced with a layer, adjacent to the impregnated metal facing surface, of heat insulating refractory material or exothermic material. Such a facing layer may be formed of any of the heat-insulating refractory materials and exothermic materials, with binding agents, all as noted above for the production of the impregnated layer. The thickness of such a facing layer is preferably less than about 50 mm, more preferably less than about 25 mm, and its density is preferably between about 0.1 and about 2.2 gm/cc, more preferably about 0.2 and about 1.5 gm/cc.

If desired, in order to enhance the self-supporting characteristics of the insulating material of the invention, a metal grid or mesh or other reinforcing element may be incorporated into the fibrous mat either during manufacture or by any other convenient method. Where the material has a facing layer of refractory heat insulating or exothermic material, the mesh may be situated between such facing layer and the fibrous mat.

The materials of the present invention may be formed by any convenient method, but the preferred technique is to form a slurry, preferably aqueous, of the constituents of the impregnant and of the binder, place the fibrous mat on a mesh support, bring the slurry onto the mat and, by the application of pressure or suction, force the liquid medium of the slurry through the fibrous mat and away, leaving the slurry solids impregnating the upper portion of the mat, and if desired, constituting a layer thereover. The resultant damp slabs may then be stoved to drive off remaining slurry medium (usually water) after which the slab is ready for use.

The following examples will serve to illustrate the novel insulating material of the invention and several methods by which it may be made. These examples are not, however, intended as limitations upon the scope of the invention.

EXAMPLE 1

50 grams of slag wool was dispersed in 800 grams of water and formed to shape on a 60 mesh screen using 20 p.s.i. air pressure. A slurry was made of 50 grams of a commercial exothermic hot topping compound (sold under the Registered Trade Mark FERRUX 107) and 2 grams of phenolic resin powder in 200 grams of water and the mixture filtered through the slag wool pad using 20 p.s.i. pressure. The duplex pad formed was dried at 200° C. for 2 hours. A good bond existed between the two layers. The exothermic layer exhibited some friability and the slag wool layer was very soft.

EXAMPLE 2

50 grams of slag wool was dispersed in 800 grams of water and formed to shape on a 60 mesh screen using 20 p.s.i. air pressure. A slurry was made of 45 grams of the exothermic hot topping compound noted in Example 1, 2 grams of phenolic resin, and 5 grams slag wool in 300 grams of water. The mixture was filtered through the slag wool pad using 20 p.s.i. air pressure. The duplex pad was dried at 200° C. for 2 hours. A good bond existed between the two layers. The exothermic layer was of good quality, but the slag wool layer was soft.

EXAMPLE 3

Example 2 was repeated with the addition of 4 percent of phenolic resin to the slag wool before slurrying. The duplex pad was of good quality both layers being strong.

EXAMPLE 4

456 grams of slag wool and 18 grams of phenolic resin powder was slurried in 10,800 grams of water, and filtered through a 60 mesh screen using a 28 inch vacuum to suck the material through the screen. 900 grams of the commercial exothermic hot topping compound noted in Example 1 and 36 grams of phenolic resin powder was slurried in 5,400 grams of water and filtered through the slag wool pad. After drying, the duplex slab weighed 521 grams and was 15 mm thick. Overall density of the slab was 0.63 gm/cc.

Heat flow tests indicated that at 1,410° C. total quantity of heat transmitted through the specimen amounted to 10.250 joules/cm$^2$, from 0 to 60 minutes.

EXAMPLE 5

200 grams of papers, 750 grams of slag wool and 50 grams of phenolic resin powder were slurried and filtered using a 28 inch vacuum to suck the material through a 60 mesh screen. 900 grams of an Exothermic Hot Topping Compound mix (of, by weight 2 percent sodium nitrate, 2 percent sodium cryolite, 10 percent red iron oxide, 86 percent ball mill dust) was slurried in water together with 50 grams phenolic resin powder, and 50 grams of slag wool. This mixture was filtered through the slag wool layer. Total thickness of the pad was 36 mm of which 9 mm was exothermic and 27 mm slag wool. Average density of the duplex pad was 0.48 gm/cc. Density of the insulator portion was determined as 0.3 gm/cc. and that of the exothermic 1.28 gm/cc. Total heat transferred through the duplex at 1,410° C. was determined at 9100 joules/cm$^2$ for 0 to 60 minutes.

We claim as our invention:

1. A material for minimizing heat loss from the exposed surfaces of molten metal comprising a preformed and self-supporting fibrous mat in sheet form which may be handled without disintegrating and which may be cut to size prior to the application of said preformed and self-supporting mat to the exposed surfaces of molten metal having an inner metal facing surface and an outer exposed surface, with only the metal facing surface of said mat being impregnated with a material selected from the group consisting of heat insulating refractory materials and exothermic materials, and containing a binding agent to bind said material to the fibers of the metal facing surface of said preformed and self-supporting fibrous mat, said impregnated metal facing surface having an average porosity of less than about 50 AFS.

2. A material for minimizing heat loss from the exposed surfaces of molten metal according to claim 1 which is impregnated on the metal facing surface of said fibrous mat with a heat insulating refractory material selected from the class consisting of finely divided sand, silica flour, silimanite, grog, zirconia, burned dolomite, refractory silicates, alumina, magnesia, sircon flour and chromote flour.

3. A material for minimizing heat loss from the exposed surfaces of molten metal according to claim 2 wherein at least 50 percent by weight of the finely divided material passes a 200 BSS mesh.

4. A material for minimizing heat loss from the exposed surfaces of molten metal according to claim 1 wherein the metal facing surface of said mat is impregnated with an exothermic material consisting essentially of finely divided oxidisable material and an oxidising agent therefor.

5. A material for minimizing heat loss from the exposed surfaces of molten metal according to claim 4 wherein the finely divided oxidisable material is selected from the class consisting of particulate aluminum, calcium silicide and ball mill dusts, at least 5 percent by weight of which passes a 200 BSS sieve.

6. A material for minimizing heat loss from the exposed surfaces of molten metal according to claim 4 wherein the oxidising agent is selected from the class consisting of alkali metal and ammonium nitrates, chlorates and perchlorates, iron oxide and manganese dioxide.

7. A material for minimizing heat loss from the exposed surfaces of molten metal according to claim 1 wherein the fibre of said fibrous mat is a refractory fibre selected from the class consisting of aluminum silicate, calcium silicate and metal fibres.

8. A material for minimizing heat loss from the exposed surfaces of molten metal according to claim 1 wherein the fibre of said fibrous mat is an organic fibre selected from the class consisting of cotton, jute and acrylonitrile fibres.

9. A material for minimizing heat loss from the exposed surfaces of molten metal according to claim 1 wherein the binding agent is selected from the class consisting of natural and synthetic gums and resins, alkali metal silicates, sulphite lye, colloidal silica and aluminum phosphates.

10. A material for minimizing loss from the exposed surfaces of molten metal according to claim 1 wherein the total thickness of said fibrous mat is between about 6 and about 150 mm thick, and wherein the impregnation of the metal facing surface extends to a depth of between about 1 and about 50 mm.

11. A material for minimizing heat loss from the exposed surfaces of molten metal according to claim 1 wherein the total thickness of said fibrous mat is between about 12 and about 50 mm thick, and wherein the impregnation of the metal facing surface extends to a depth of between about 6 and about 25 mm.

12. A material for minimizing heat loss from the exposed surfaces of molten metal according to claim 1 which is faced with a layer, on the impregnated metal facing surface of said mat, selected from the class consisting of heat insulating refractory materials and exothermic materials.

13. A material for minimizing heat loss from the exposed surfaces of molten metal according to claim 12 wherein said facing layer is less than about 25 mm thick and has a density of between about 0.2 and about 1.5 mm/cc.

14. A material for minimizing heat loss from the exposed surfaces of molten metal according to claim 12 wherein said fibrous mat is reinforced by a metal mesh of grid.

15. A process for minimizing heat loss from the exposed surfaces of molten metal which comprises applying to said exposed metal surfaces a fibrous mat having only one of its surfaces impregnated with a material selected from the group consisting of heat insulating refractory materials and exothermic materials, and a binding agent to bind said impregnating material to the fibers of the impregnated surface of said mat, so that the impregnated surface of said fibrous mat is adjacent to and covers the exposed metal surfaces, said impregnated surface having an average porosity of less than about 50 AFS.

16. The process of claim 15 wherein the impregnated surface of the fibrous mat applied to the exposed surfaces of molten metal is impregnated with a heat insulating refractory material selected from the class consisting of finely divided sand, silica flour, sillimanite, grog, zirconia, burned dolomite, refractory silicates, alumina, magnesia, sircon flour and chromote flour.

17. The process of claim 15 wherein the impregnated surface of the fibrous mat applied to the exposed surfaces of molten metal is impregnated with an exothermic material consisting essentially of finely divided oxidisable material and an oxidising agent therefor.

18. The process of claim 15 wherein the fibre of the fibrous mat applied to the exposed surfaces of molten metal is a refractory fibre selected from the class consisting of aluminum silicate, calcium silicate and metal fibres.

19. The process of claim 15 wherein the fibre of the fibrous mat applied to the exposed surfaces of molten metal is an organic fibre selected from the class consisting of cotton, jute, and acrylonitrile fibres.

20. The process of claim 15 wherein the binding agent used to bind the impregnating material to the fibers of the impregnated surface of the fibrous mat applied to the exposed surfaces of molten metal is selected from the class consisting of natural and synthetic gums and resins, alkali metal silicates, sulphite lye, colloidal silica and aluminum phosphates.

21. The process of claim 15 wherein the total thickness of the fibrous mat applied to the exposed surfaces of molten metal is between about 6 and about 150 mm, and wherein the impregnation of the impregnated surface extends to a depth of between about 1 and about 50 mm.

22. The combination comprising an exposed surface of molten metal and a material for minimizing heat loss from said exposed molten metal surfaces which comprises a preformed fibrous mat in sheet form having an inner metal facing surface which is adjacent to and covers said exposed molten metal surfaces and an outer exposed surface, with only the metal facing surface of said mat being impregnated with a material selected from the group consisting of heat insulating refractory materials and exothermic materials, and containing a binding agent to bind said material to the fibers of the metal facing surface of said fibrous mat, said impregnated metal facing surface having an average porosity of less than about 50 AFS.

*23. In a shaped heat article for forming a molten-metal contacting lining for metallurgical moulds or the like which comprises a refractory composite consisting essentially of an inorganic fibrous refractory material and a granular refractory filler material, an exothermic mixture of a fuel and an oxidising agent, and a binder, the improvement wherein said fibrous refractory material is a material selected from aluminosilicate fibres and said shaped article has a density of about 0.2 to 1.5 grams per cubic centimeter.*

*24. A shaped heat insulating article according to claim 23 comprising a fluoride catalyst for the exothermic mixture.*

*25. A shaped heat insulating article according to claim 24 wherein the fluoride catalyst is cryolite.*

*26. The article defined in claim 23, wherein said granular material is one or more materials selected from the group consisting essentially of alumina, magnesia, chromite and zirconia.*

*27. The article defined in claim 23, wherein the fuel is one or more materials selected from the group consisting essentially of aluminum and magnesium powders.*

*28. The article defined in claim 27, wherein the oxidising agent is one or more materials selected from the group consisting essentially of iron oxide or manganese dioxide.*

*29. In a shaped heat insulating article for forming a molten-metal contacting lining for metallurgical moulds*

*or the like which comprises a refractory composite consisting essentially of an inorganic fibrous refractory material and a granular refractory filler material, an exotheric mixture of a fuel and an oxidising agent, and a binder, the improvement wherein said fibrous refractory material is a material selected from aluminosilicate fibres and said shaped article has a density of about 0.48 grams per cubic centimeter.*

*30. In a shaped heat insulating article for forming a molten-metal contacting lining for metallurgical moulds*

*or the like which comprises a refractory composite consisting essentially of an inorganic fibrous refractory material and a granular refractory filler material, an exothermic mixture of a fuel and an oxidising agent, and a binder, the improvement wherein said fibrous refractory material is a material selected from aluminosilicate fibres and said shaped article has a density of up to 0.5 grams per cubic centimeter.*

* * * * *